United States Patent
Breiling

(10) Patent No.: US 7,126,980 B1
(45) Date of Patent: Oct. 24, 2006

(54) PAR AND OUT-OF-BAND RADIATION REDUCTION IN CODE MULTIPLEX MODULATION SYSTEMS

(75) Inventor: Marco Breiling, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 846 days.

(21) Appl. No.: 10/149,468

(22) PCT Filed: Nov. 28, 2000

(86) PCT No.: PCT/EP00/11885

§ 371 (c)(1),
(2), (4) Date: Sep. 25, 2002

(87) PCT Pub. No.: WO01/43301

PCT Pub. Date: Jun. 14, 2001

(30) Foreign Application Priority Data

Dec. 6, 1999 (DE) ............................. 199 58 658

(51) Int. Cl.
H04B 1/69 (2006.01)
H04B 1/707 (2006.01)
H04B 1/713 (2006.01)

(52) U.S. Cl. .................................................. 375/146
(58) Field of Classification Search ................ 375/146, 375/346, 469, 350
See application file for complete search history.

(56) References Cited

U.S. PATENT DOCUMENTS 6,067,313 A * 5/2000 Cafarella et al. ............ 375/130

FOREIGN PATENT DOCUMENTS

EP 903 871 3/1999
JP 10 12 6309 5/1998

OTHER PUBLICATIONS

Van Eetvelt, P., GH. Wade, and M. Tomlinson; Peak to Average Power Reduction for OFDM Schemes by Selecting Scrambling; Oct. 1996, Electronics Letters.

* cited by examiner

Primary Examiner—Chieh M. Fan
Assistant Examiner—Jia Lu
(74) Attorney, Agent, or Firm—Michael A. Glenn; Glenn Patent Group

(57) ABSTRACT

In an apparatus for generating a transmit sequence comprising information from a plurality of information channels, a first means serves for generating a plurality of different candidate channel sequences from information of a first information channel of the plurality of information channels using a first code sequence associated with the first information channel, wherein each candidate channel sequence carries the same information as the information of the first information channel. A second means is provided to provide at least one candidate channel sequence for a second information channel from the plurality of information channels using a second code sequence associated with the second information channel and differing from the first code sequence. To receive an optimum transmit sequence resulting in a minimum out-of-band radiation combined sequences are examined, wherein each combined sequence may be obtained by a combination of at least one candidate channel sequence from each information channel. After this either the combined sequence is selected resulting in a minimum out-of-band radiation or the optimum candidate channel sequences are selected from the individual information channels, which together result in the optimum combined sequence causing a minimum out-of-band radiation. Therefore it is possible to reduce peak values e.g. occurring in the code multiplex modulation concept in the transmit sequence distortion-free.

15 Claims, 6 Drawing Sheets

PAR AND OUT-OF-BAND RADIATION REDUCTION IN CODE MULTIPLEX MODULATION SYSTEMS

FIELD OF THE INVENTION

The present invention generally relates to the digital communication transmission and, in particular, to concepts for reducing the out-of-band radiation of digital communication transmitters for transmit sequences generated using a code multiplex process.

BACKGROUND OF THE INVENTION AND PRIOR ART

In general, a digital communication transmitter includes a source for information, which could be e.g. an MPEG audio encoder for digital broadcasting and/or an MPEG video encoder for digital television. Typically, the output data of the communication source, which are present in form of a digital bit stream, are then encoded using a channel encoder to add redundancy to the bit stream, which serves to help overcome transmission errors in the receiver. Subsequently, the channel-encoded digital bit stream is fed into a so-called "interleaver" which changes the order of data according to an algorithm which is known to the receiver to prevent so-called burst errors in the transmission channel from resulting in a loss of a greater, coherent part of the communication, but only in smaller and short losses which are distributed over a longer period of time. Using a so-called mapper, and depending on the type of modulation, the nested bit stream at the output of the interleaver will now be mapped to modulation symbols.

If no modulation is used and if the digital bit stream is, so to speak, sent directly without any modulation, the mapper as well as the subsequently used modulator will be omitted.

If, however, use is made of a modulation method, e.g. a multi-carrier modulation process, the mapper is followed by a modulator modulating the modulation symbols onto the communication carriers.

Recently, the OFDM process for digital broadcasting applications has become ever more popular. In this process a multiplicity of sub-carriers is used onto which the modulation symbols produced by the mapper are modulated. In this case, the modulation process is an inverse discrete Fourier transform to generate, as is generally known, a discrete time signal from the many modulated carriers. The discrete, usually complex time signal occurs in the form of complex sample values or samples, which are then fed into an interpolation low pass in order to remove the periodically repeating spectral components. A signal is applied across the output of the interpolation low pass, which is typically modulated onto an RF carrier frequency by way of a complex IQ modulator to receive a signal which will finally be fed into a transmitting amplifier which will supply the amplified signal to an antenna by which the signal will finally be emitted.

In broadcasting applications, due to the high power requirements, valve amplifiers, such as klystrons or travelling wave tubes, are typically used at the output of the amplifier. Should smaller powers suffice, such as in mobile radio, where there exists a dense network of transmitters, transistor amplifiers may also be used.

Both transistor amplifiers and valve amplifiers have in common that they are linear only in a certain input power range and, regarding increasing input powers, have a decreasing output power curve which finally exhibits a constant behaviour when the amplifier has been completely saturated. In other words, the amplifier exerts non-linear distortions on the input signal owing to its non-linear characteristic curve towards higher input powers.

In situations where a certain frequency band has been assigned for a certain transmitting application by e.g. a state licensing authority, regulations exist in that the transmit signal for the specific licensed transmitting application may only have power in a prescribed band, but, however, may have no or only small power outside the assigned band. Power outside the assigned band is also referred to as out-of-band radiation.

As has already been mentioned, in the case of higher input powers, the non-linear characteristic curve of the amplifier leads to non-linear distortions, such, that higher harmonic waves are generated by the amplifier which are no longer within the assigned band but which reside outside of the band and which may be measured as out-of-band radiation. It is known that these non-linear distortions result in a relatively white spectrum. If the input signal into the amplifier is still band-limited—a situation which can be assumed in the case of OFDM modulation—the output signal then has power outside of this band.

To avoid this, i. e. to observe regulations by the licensor for tolerance schemes established for frequency bands, i. e. how much of the out-of-band radiation is still acceptable outside the assigned band, the input voltage into the amplifier should rarely or not at all exceed the maximum input voltage for a distortion-free amplification. In other words, this means that the maximum input voltage which is actually available should be as low as possible. If the maximum input voltage is always smaller than the maximum voltage, at which the amplifier is on the verge of operating in the non-linear range or amplifies only very little in the non-linear range with its out-of-band radiation ranging below the permitted value, distortions will never occur which will result in a higher than permitted out-of-band radiation.

Disadvantages of the above described OFDM process include the typically occurring great peak to average power ratio which is also referred to as PAR. In a graphic description, large peaks may occur in the time signal, i. e. in the OFDM symbol after the IDFT, when the carriers are being occupied so unfavourably, that, at a certain point in time, e.g. all of the 256 OFDM sub-carriers are superimposed in a constructive manner. In this case, a large signal peak will occur which may well be 10 to 20 dB above mean signal power. In order to keep to the permitted out-of-band radiation, a high power reserve is typically retained in the transmitting amplifier, which is also referred to as "power back-off". In other words, the amplifier is operated at an operating point which is set so low that even a high power peak still lies in the linear range of the amplifier.

This mode of operation of an amplifier represents an extremely inefficient mode of operation in which the amplifier requires much supply power but provides only a relatively low output power. The demand for reduced out-of-band radiation in connection with high peak values in the time signal, which do not only occur in an OFDM modulation but also e.g. in a one-carrier process by an impulse former, i. e. which may generally occur during a filtering process, results in a need for more expensive amplifiers which have to be operated with a great amount of power reserve and which provide low efficiency. It is efficiency, however, which also represents an issue being paid ever more attention, especially for smaller battery-powered systems, particularly with respect to mobile radio and limited storage capacity accumulators used therein.

WO 98/10567 A1 relates to a method for reducing the peak value factor in digital transmission methods. Here, the basic idea is to take precautions in the digital domain to prevent high signal peaks from occurring in the time signal, such, that lower power reserves will suffice for the transmitting amplifier without any greater than permissible out-of-band radiation occurring. The known concept is generally referred to as "selected mapping". Selected mapping or SLM actually means only that different possible signals, which may also be referred to as representative or candidate transmit sequences, are generated in any manner U from a message to be transmitted, i. e. an information word or, generally speaking, a vector of data bits. However, not all of these signals are transmitted. Instead, a special signal is selected as the transmit signal. In particular, each transmit signal has a peak value to be measured. The candidate transmit signal with the lowest peak value will finally be selected and transmitted as the actual transmit signal.

On the receiver side, the object is to find out (a) which message is available and (b) which of the U possible representatives was transmitted per message. The receiver has two possibilities to find this out. First, by means of page information which is reported somehow or other from the transmitter to the receiver and which relates to which of the U candidate transmit sequences was selected. What is disadvantageous about this method is the fact that this page information is transmitted explicitly and, in particular, that this page information has to be given special protection from transmission errors. In the case of digital broadcasting, where the channel may be disturbed in some way or other and such a disturbance is thus not easy to predict, this represents a critical issue.

If the page information is received incorrectly, error-free processing of the receiving signal is also no longer possible. This fact renders this way of signalising using page information relatively awkward.

Another possibility is to perform the concept without transmitting the page information. Solely by means of the receiving signal, the receiver then has to find out which message of M messages, i. e. which modulation symbol from a fixed number of modulation symbols, is available and which of the U candidate transmit sequences was transmitted per message. Instead of M possible transmit signals or modulation symbols from which the receiver has to choose the most likely signal or symbol, M×U possible transmit signals will now have to be considered, if no page information is used. This may cause the error probability to rise considerably. Furthermore, a suitable selection of U possible candidate transmit sequences per message represents a critical issue. So far, there has been a lack of a favourable approach for this problem, so that even the transmission without explicit page information has not yet proved itself suitable for practice.

A special implementation of SLM, which is also described in WO 98/10567 A1, is referred to as PTS concept (PTS=Partial Transmit Sequences). The U candidate transmit sequences are obtained the following way. The transmit signal is available, i. e. as a vector of complex-valued elements, before a final linear filtering process, e.g. a spectral shaping in one-carrier processes or an inverse Fourier transform in OFDM. The vector will now be partitioned into subsets, i. e. in partial transmit sequences. The elements of each subset may then be multiplied with the same complex number having the magnitude of 1. In the complex plane, these elements are all rotated about the same angle. Then, the final linear filtering operation will be effected through which the high peak values are typically generated first.

Through the free choice of the complex number used for multiplication, it is now possible to generate the plurality of candidate transmit sequences. In this case, too, there are the two possibilities, as have been explained above, which include the option to operate with or without page information. Yet, the difference here is that it is possible to operate without transmitting explicit page information. This is possible since the information to be transmitted is not transmitted absolutely into the complex-valued elements of the time-discrete transmit signal, but in quotients of successive elements of the same subset. In general, this concept is referred to as differential precoding. Since all of the elements of one subset have been multiplied by the same complex number, the quotient of two successive elements of the same subset will remain the same for each U candidate transmit sequence. Accordingly, the receiver only has to calculate these quotients and is thus given back the transmitted information.

FIG. 10 shows a basic block diagram of one portion of a transmitter for transmit sequences generated according to a code multiplex process. An exemplary code multiplex process is known in the art as a CDMA process (CDMA=Code Division Multiple Access). CDMA is a long standing transmission technique wherein the information to be transmitted which is digitally available in the base band is spectrally "spread" during modulation, wherein this spreading is carried out using a unique code available for each individual connection, i.e. for each individual user or information channel. Thus, this technique is also called "Spread Spectrum". The useful information is herefore weighted with a predetermined, typically higher-frequency bit sequence for every information channel, which is also referred to as code sequence. Thus, the occupied transmit bandwidth widens and/or the energy of this signal is distributed to a larger bandwidth.

This procedure is repeated for several information channels, and the thus obtained channel sequences are then added in order to form a transmit sequence. If a user knows the code for an information channel, then he can reconstruct this information channel from a received transmit sequence using a correlator which may be implemented in the form of a "matched filter". The implementation of the matched filter hereby depends on the respective code sequence of the information channel.

One advantage of the CDMA technique generally is a continuously good quality and a higher capacity with a lower power consumption regarding the transmitter.

Due to these advantages of the CDMA process it is assumed, that the CDMA process will be used by the next mobile communication generation called UMTS, and which is the descendant of GSM. In particular, the CDMA process is used in the so-called downlink. Downlink hereby means, that the base stations and not the mobile parts are regarded as transmitters. The radio link from a base station to a mobile part is also referred to as downlink, while the radio link from a mobile part to a base station is referred to as uplink.

In particular, FIG. 10 shows a CDMA-stage. For reasons of clarity, in FIG. 10 only three information channels 102, 104 and 106 are shown. The three information channels may for example be three separate communication links between mobile radio users who all want to communicate via one radio channel. Information or messages in the respective information channels are optionally submitted to a usual channel encoding and a subsequent nesting, as it is shown by the dashed lines 108. This is illustrated in FIG. 10 by an encoder block 108*a* referred to as ENC. Typically the encoder block 108*a* will carry out a forward error correction, also referred to as FEC. An interleaver 108b is connected downstream to the encoder 108a designated with ILV, and which scrambles the bit sequence output by the encoder 108a in order to make the whole system insensitive against so-called burst errors.

The somehow encoded and nested information of the first information channel is hereupon fed into a means 110 for being weighted with a code sequence. An own code sequence is allocated to every information channel. This means, that a first code sequence 112 is associated with a first information channel 102, that a second code sequence 114 is associated with the second information channel 104 and a third code sequence 116 is associated with the third information channel 106. The three code sequences need at least to be different from each other, so that the information channels may be separated again. The best separation and therefore the best correlation peaks at the output of a correlator in a receiver are reached when the three code sequences are all orthogonal to each other, such that in a correlation with one code sequence only correlation peaks occur, if this code sequence is present in the examined signal in a way, that for the other code sequences which are also present in the examined signal no correlation peaks occur due to the orthogonality properties. As it is known, so-called pseudo noise sequences are used as code sequences which have the property that they comprise a relatively white spectrum and may on the other hand be produced by a feed-back shift register which is started depending on a certain output value.

At the output of the weighting means a so-called channel sequence is presented which generally speaking includes the information of the information channel weighted with the code sequence. The channel sequences of the individual sub-channels are then combined in one means 120, wherein this combination is typically carried out using a simple addition. On the output side a transmit sequence is applied then which is upconverted, amplified and emitted via an antenna or fed into a wire-bonded transmission channel by ways known in the art.

In the following the functioning of the weighting means 110 for weighting information using a code sequence is discussed. The information is for example applied at the output of the interleaver 108b or, however, if the same is not present, as information per se in the form of a sequence of individual bits. These bits may comprise a value of +1 for example for the information "1" and a value of −1 for the information "0". A bit having a value of −1 leads to the fact that at the output of the weighting means 110 the code sequence itself is present, while a bit having a value of −1 causes that at the output of the weighting means 110 the inverted code sequence occurs, i.e., the original code sequence phase shifted by 180 degrees. When a sequence of bits is present at the input of the weighting means 110, there will be a sequence of positive or negative code sequences present at the output of the weighting means 110, which together form a channel sequence for this information channel. The weighting means 110 therefore causes that the channel sequence at the output of the weighting means 110 comprises a length of m×n bit, when the code sequence is n bit long and when a bit sequence at the output of the interleaver is m bit long.

The messages for the individual users are therefore optionally encoded and interleaved, then the weighting means 110 follows, which may generally also be referred to as mapper, as it generally carries out a mapping of the m bit to the m×n bit. As it is illustrated in FIG. 10, the code sequences differ for every information channel, which is critical for the CDMA process, so that the individual information channels may be separated again.

The different channel sequences of the different information channels are added in their combination means 120, as it was described above. This adding up of the individual channel sequences may cause the transmit sequence comprising high signal peaks. This problem becomes more critical especially when not only a small number of information channels is used, but when a large number of information channels needs to be added in order to obtain the transmit sequence. In the worst case all channel sequences have for example a positive value at a certain time, which results in a high positive peak value of the transmit sequence.

For this problem of high signal peaks in a CDMA transmit sequence there has only been the solution of operating the transmit amplifier with a large reserve, which leads to the mentioned disadvantages, as was discussed above.

A simple combination of the SLM-concept and/or the PTS concept as a sub-group of the SLM concept with the CDMA process, i.e. that a plurality of channel sequences is produced instead of one channel sequence, among which the one with the lowest peak value is selected then, leads to no drastic solution of the problem. The reason for this is, that the channel sequences are independent from each other for the individual information channels, such that it cannot be assumed that the most favourable candidate channel sequences from the individual sub channels will form a transmit sequence together which differentiates itself by a low peak value and/or by a low out-of-band radiation, i.e. which is the optimum.

SUMMARY OF THE INVENTION

It is the object of the present invention to provide a solution for the problem of out-of-band radiation which is suitable for a code multiplex modulation process.

In accordance with several aspects of the present invention, this object is achieved by an apparatus for generating a transmit sequence, by a method for generating a transmit sequence, by an apparatus for retrieving information or by a method for retrieving information.

The present invention is based on the findings that the high peak values in a transmit sequence cannot be minimized by selecting the best candidate channel sequence for every information channel, but that a selection and/or optimising of the transmit sequence must be carried out on the basis of combined sequences. This means, that first of all a plurality of candidate channel sequences is generated for every information channel considering a code sequence associated with this information channel, whereupon each candidate channel sequence is combined with another candidate channel sequence from another channel, etc., as if it were the only candidate channel sequence of this channel, such, that a plurality of combined transmit sequences results which may in principle all be sent, as they all contain all information from the information channels of which, however, only one meets a predetermined criterion best. The predetermined criterion may for example be the lowest peak value, the lowest average power, etc. According to the invention a selection is therefore not carried out from individual candidate channel sequences but from the plurality of combined sequences. The selection may be done by selecting and directly outputting the combined transmit sequence as a transmit sequence or by selecting the individual candidate channel sequences from the different information channels which result in this optimum combined sequence, depending on the implementation and the boundary conditions, in order to be added after the selection to form the transmit sequence.

By the combination of the candidate channel sequences and the subsequent selection from the combined sequences it is ensured that the most optimum transmit sequence is found out, while this is not secured in the case of selecting the best candidate channel sequences for each information channel separately, as the individual information channels are independent of each other.

It is noted that already with the use of a low number of candidate channel sequences in a single information channel a relatively high diversity among the different combined sequences is reached. If, for example, the case is observed, in which eight information channels are present and in which two candidate channel sequences are formed each in the first and second information channel, a number of four different combined sequences results here, from which the one is selected which is closest to the predetermined criterion.

BRIEF DESCRIPTION OF THE DRAWINGS

Preferred embodiments of the present invention are explained in detail below with reference to the attached drawings in which:

FIG. 1 shows an inventive apparatus for generating a transmit sequence at an output 202, wherein the transmit sequence comprises information from a plurality of information channels. The information channels are illustrated only schematically in FIG. 1, i.e. a first information channel 204, a second information channel 206 and a third information channel 208. Each information channel may comprise a means for generating a plurality of different candidate channel sequences. Particularly, the first information channel comprises a first means 210 for generating a plurality of different candidate channel sequences from an information of the first information channel 204 from the plurality of information channels, wherein the first code sequence 212 is used, and wherein each of the generated candidate channel sequences carries the same information at the output of the means 210, that is the information of the first information channel, and wherein each candidate channel sequence is created at the output of the means 210 using the first code sequence 212. The candidate channel sequences at the output of the means 210 are, however, different in that they were submitted to a selected mapping process, which is expressed by the fact that they are different but carry the same information.

Figure 1:
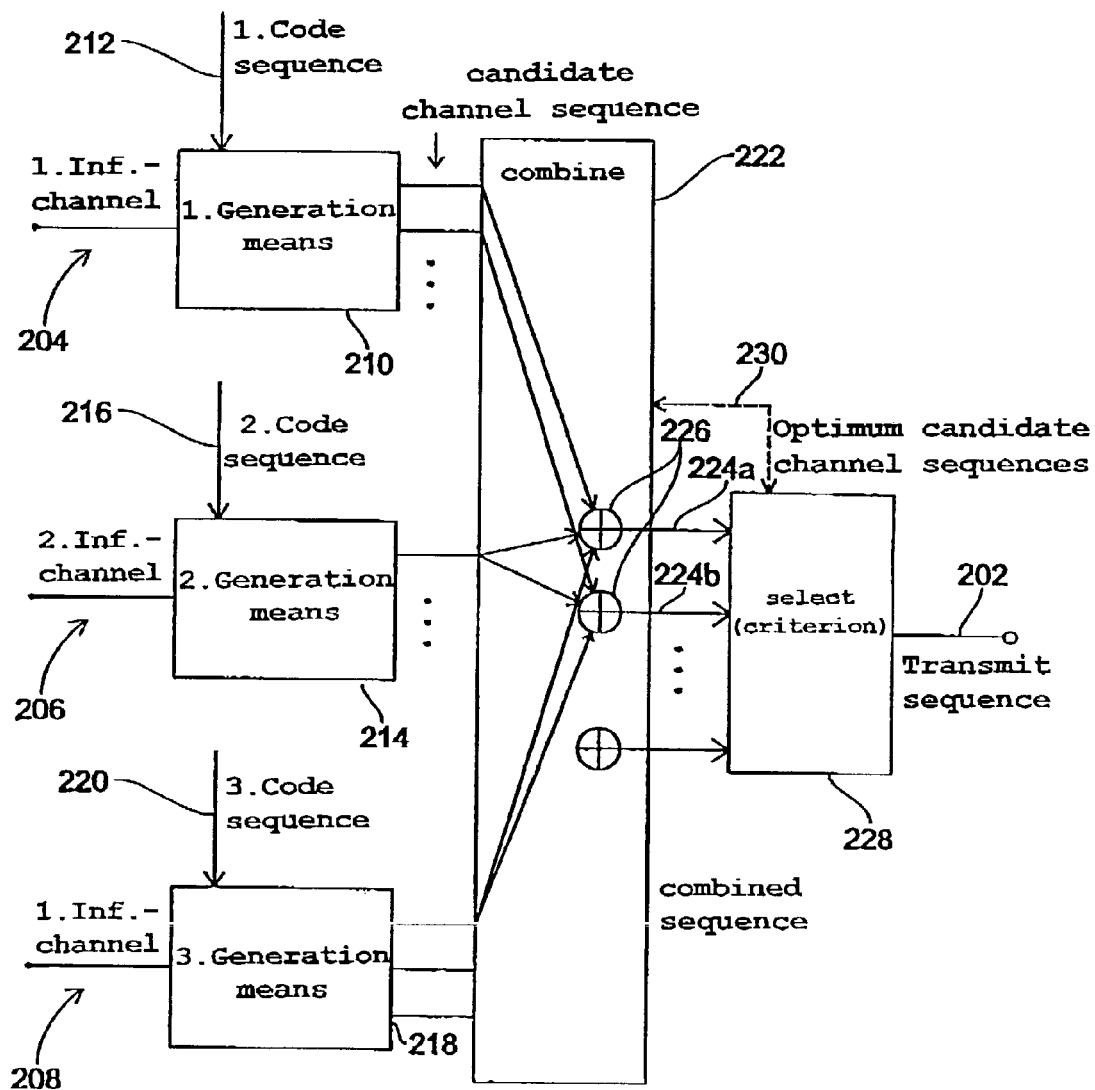
FIG. 1 shows a block diagram of a apparatus according to the invention.
Figure 10:
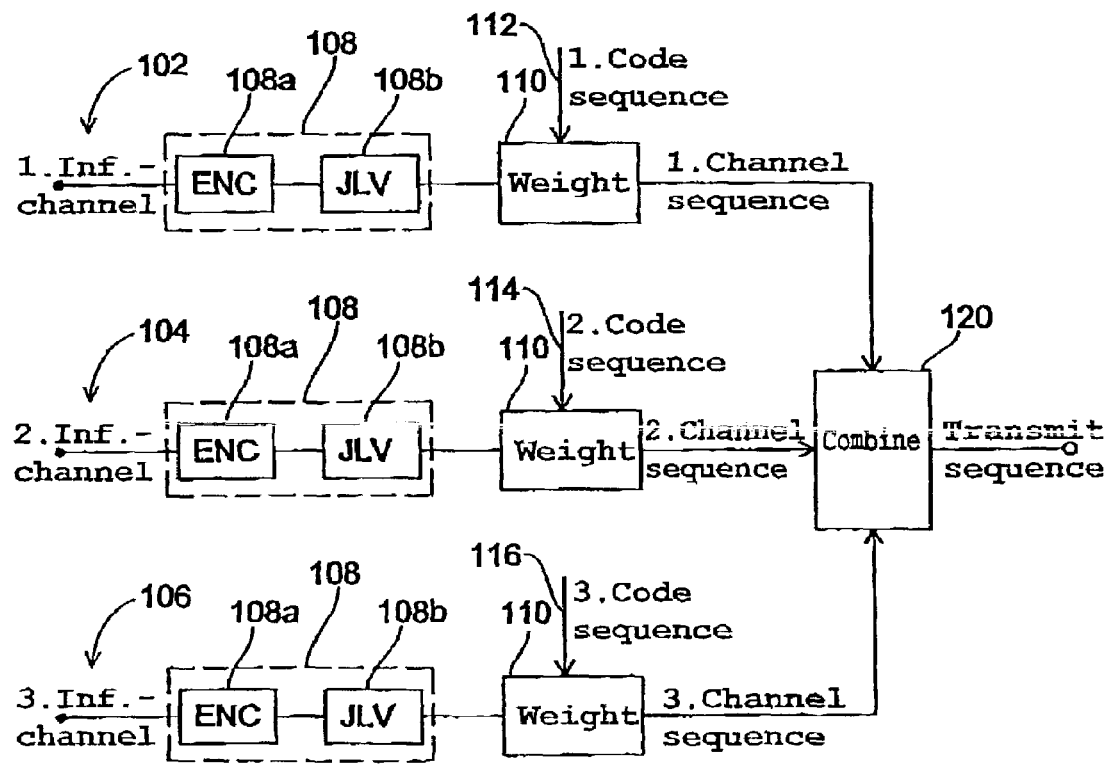
FIG. 10 shows a block diagram of a known code multiplex modulator.

The inventive apparatus shown in FIG. 1 further includes a second means 214 which in its simplest form only creates one single candidate channel sequence using a second code sequence 216, wherein the second code sequence is associated with the second information channel 206 and is differing from the first code sequence 212, as it was already discussed referring to FIG. 10. The inventive apparatus which is shown in FIG. 1 as an example further includes a third means 218 for generating at least one candidate channel sequence using a third code sequence 220. It is noted that an inventive effect is already obtained when only one means for generating a plurality of candidate channel sequences is provided in an information channel and the other information channels are processed according to the prior art, as it was shown in FIG. 10. Additionally, at least two different candidate channel sequences need to be generated for an information channel in one way or another, like for example by selected mapping, by the PTC process or even by the subsequently described method using an invertible feed-back combination algorithm. Already when two different candidate channel sequences for one individual information channel are present, a selection among two possibilities is possible in order to provide the transmit sequence at the output 202 of the inventive apparatus.

The apparatus shown in FIG. 1 further includes a means 222 for combining any candidate channel sequence for the first information channel with the candidate channel sequence for the second information channel in order to provide a plurality of combined sequences at the output of the means 222, like for example the sequences 224a and 224b. When the inventive concept is used for a CDMA modulation method the means operates for a combination with the use of adders 226. It is noted, however, that the inventive concept of combining and selecting among the combination results and not among the individual candidates for the individual information channels is not limited to the combining being carried out using an adding operation. Alternative combination possibilities, as for example a subtraction, an XOR-operation, etc. are also possible.

The inventive apparatus further includes a means 228 for selecting the combined sequence from the plurality of combined sequences 224a, 224b as a transmit sequence, which fulfils a predetermined criterion. Alternatively, the selecting means 228 is arranged for implementation reasons, so that it does not select and output a combined sequence observed directly in the optimising process, but requests the candidate channel sequences underlying this optimum combined sequence, which are referred to as optimum candidate channels sequences in FIG. 1, via a control line 230 from the combination means 222 and then adds it up itself in order to form the transmit sequence at the output 202. It is obvious that these two mentioned options, i.e. with control line 230 or without control line 230, are equal to each other by a direct output of the optimum combined transmit sequence.

Any means may be used as the means 210, 214, 218 for generating a plurality of candidate channel sequences for the present invention, as long as the candidate channel sequences are all different from each other but carry the same information, and as long as any candidate channel sequences from one information channel are weighted with the code sequence associated with this information channel.

This means, that for example the SLM concept described at the beginning or the PTS concept described at the beginning may be used. With the SLM concept it may generally be required to transmit page information in order to indicate which candidate channel sequences finally led to the transmit sequence. This means, that when for example three information channels are considered, as it is shown in FIG. 1, page information referring to all three generating means need to be transmitted in the transmit sequence output by the means 228 if different candidate channel sequences were generated for example for all three channels.

In the PTS concept it is in contrast not strictly necessary to transmit page information. The disadvantage about this concept is that it is only practicable in the case of differential precoding.

A further possibility which is preferable due to its practicability and its flexible applicability is to create the individual candidate channel sequences using an invertible feed-back combination algorithm and using a tag, which is added to the processing information word by a combination algorithm, and a subsequent weighting with the first code sequence.

In general, an invertible feed-back combination algorithm is used for generating the candidate channel sequences which, however, not only processes the information word from which a plurality of candidate channel sequences are generated which all carry the same information as the underlying information word, but that also a tag is processed together with the information word by the feed-back combination algorithm, wherein the individual candidate channel sequences are uniquely identified by the tag used in the generating process. Feed-back combination algorithms comprise the property that they provide different output values in the feed-back path of the combination algorithm depending on different initial states.

In other words, completely different output vectors are obtained with the same input values by the same combination algorithm, wherein the different output vectors are simply produced by the combination algorithm comprising feed-back taking on respectively different states due to the tags. If the tags are a prefix at the beginning of the information words, then the information word is processed based on an initial state of the combination algorithm determined by tag. If the tag is placed somewhere within the information word then the candidate channel sequences will not differ up to the tag. As soon as the different tag runs into the combination algorithm a "path-forming" in the combination algorithm takes place so to say through which the different candidate transmit sequences are created. If it is considered, that usually an interleaver is used which carries out a scrambling anyway, it becomes clear that it is not important in the end whether the candidate channel sequences before the interleaver are identical in an initial portion and different only in a final portion.

The tag is added to the information word itself, so that both the information word and the tag are processed by the feed-back combination algorithm, such that the tag is practically implicitly contained in any candidate channel sequence.

In other words, the tags are thus used to drive the invertible feed-back combination algorithm into a state, wherein the number of states into which the feed-back combination algorithm and therefore the memory of the combination algorithm may be driven depends on the properties of the feed-back path. Such, that any candidate channel sequence contains a different tag, any candidate channel sequence is basically processed by the feed-back combination algorithm starting from a different state. The tag in the candidate channel sequence is however not implicitly obvious any more. It only appears again when the corresponding candidate channel sequence in the receiver has been submitted to processing by the algorithm which is inverse to the algorithm in the receiver and therefore comprises a forward coupling property.

After processing by the inverted feed-back combination algorithm in the receiver the tag is not needed anymore, although it is explicitly presented here, as it basically has already done its "duty" by driving the algorithm inverse to the forward coupled combination algorithm into its respective initial state, which underlies the presented received transmit sequence.

One advantage of this concept for creating the candidate channel sequence is that no explicit transmission of page information is necessary. The tag is implicitly transmitted in the candidate channel sequence, must however not be especially protected. It is also to be noted that usually a channel encoding for adding a redundancy in the transmitter as well as an interleaving operation is carried out on the information word, so that also the tag is automatically protected by the same measures as the information word itself, without additional efforts.

The information from one information channel are thereby preferably separated into certain blocks or information words, wherein one tag is then associated with one block. The higher the number of information units in comparison to the number of units of a tag, the lower the redundancy which is added.

Figure 2:
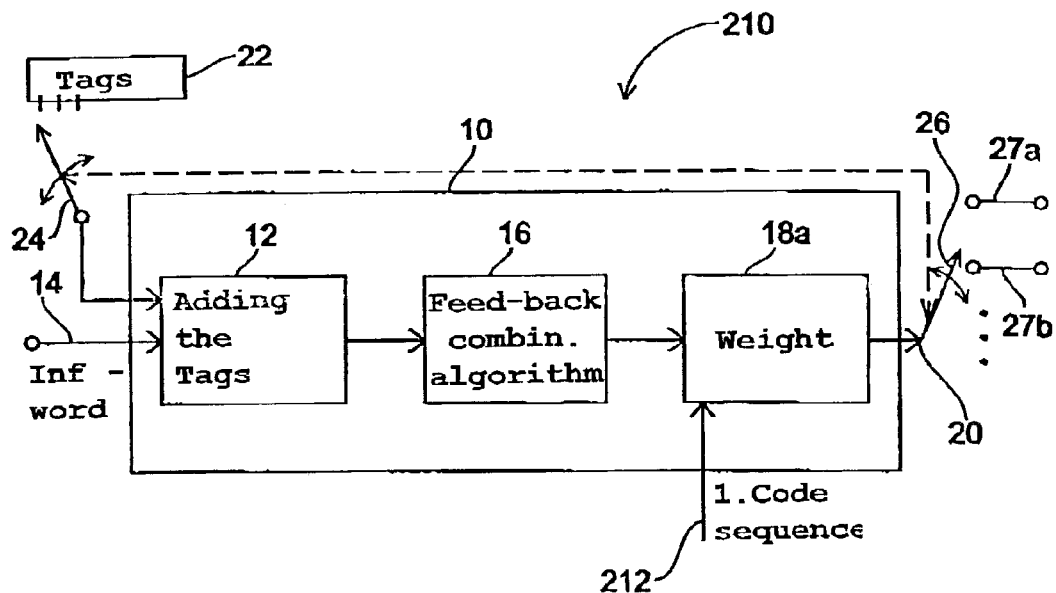
FIG. 2 shows a block diagram of a means for creating a plurality of candidate channel frequencies.

FIG. 2 shows the first means for generating a plurality of candidate channel sequences as an example at the output 27a, 27b using the first code sequence 212. Information of the first information channel are combined into an information word with a certain number of information units, which is applied at the input 14.

FIG. 2 shows a means 210 for generating a plurality of candidate channel sequences from one information word, which comprises a plurality of information units.

The means 210 initially includes a means 12 for adding a tag to an information word, which is delivered over an input 14. The information word including the tag is then fed into a means 16 for processing the information word including the added tags by an invertible feed-back combination algorithm to obtain a combined information word at the output of the means 16 in which the information units are combined with each other and/or with the inserted tag, such, at the combined information word is uniquely identified by the tag. A combined information word created this way is then fed into a means 18 for weighting the combined information word with the first code sequence 212, wherein the means 18 for weighting is arranged such, that a candidate channel sequence is created from the combined information word. Such a candidate channel sequence is applied at the output 20 of the means 210 for forming a plurality of candidate channel sequences. The means 210 for forming a plurality of candidate channel sequences is further arranged in such a way, to retrieve a new tag from a tag memory 22 using a tag switch 24 after the completion of a candidate channel sequence. Simultaneously to the tag switch 24 a candidate channel sequence switch 26 is actuated at the output site in order to provide a new candidate channel sequence at an output 27a, 27b . . . .

If the selection means 228 has received all combined sequences, the selection step starts. The individual combined sequences are examined regarding the signal properties, whereupon a combined transmit sequence is selected as a transmit sequence, which meets a predetermined criterion.

There are different possibilities for the predetermined criterion, which may also be used in combination. It is noted that the basic object of the inventive concept is to reduce the power back reserve in the transmit amplifier in a practicable and robust way without the out-of-band radiation exceeding a tolerance limit. The out-of-band radiation however exceeds a tolerance limit when the employed RF transmit amplifier is brought into its non-linear range due to a too large input signal, i.e. due to a too high time value.

The most accurate criterion is to calculate the out-of-band radiation created by the sequence for any combined sequence knowing the amplifier characteristic curve and then to take the combined sequence as a transmit sequence at the output 34 of the means 30 that causes the lowest out-of-band radiation. In this case the predetermined criterion is therefore the lowest out-of-band-radiation.

This method is however relatively cost and time consuming. A simpler, yet more inaccurate method uses the lowest peak value as a criterion. Here, each combined sequence will be examined, sample by sample, to establish the combined sequence having the lowest peak value, i.e. if complex time samples are available, having the smallest absolute set of complex samples.

A further method for examining and selecting which, in terms of time and money involved, is intermediate between the two above-mentioned methods, is to retrieve the average power of the individual combined sequences and to select as transmit sequence the candidate transmit sequences with the smallest average power. The latter method considers the case in which, solely based on a decision regarding the biggest peak value, an otherwise favourable candidate transmit sequence would be rejected only e.g. due to one single high peak value, while, a combined sequence would be selected as a transmit sequence, which has not such a high peak value, but which, due to other relatively high peak values, generates a considerable share of out-of-band radiation.

In the consent shown in FIG. 2 a serial processing is performed. In other words, the means 12, 16 and 18a exist only just once, whereby the same are serially served using different tags of the same information word to calculate the individual candidate transmit sequences one after the other.

Alternatively, said means 12, 16, 18a can be multiplied to obtain a parallel calculation of the candidate transmit sequences, such, that a different tag will be entered into each parallel path. Mixed serial/parallel solutions are also possible as desired.

Figure 3:
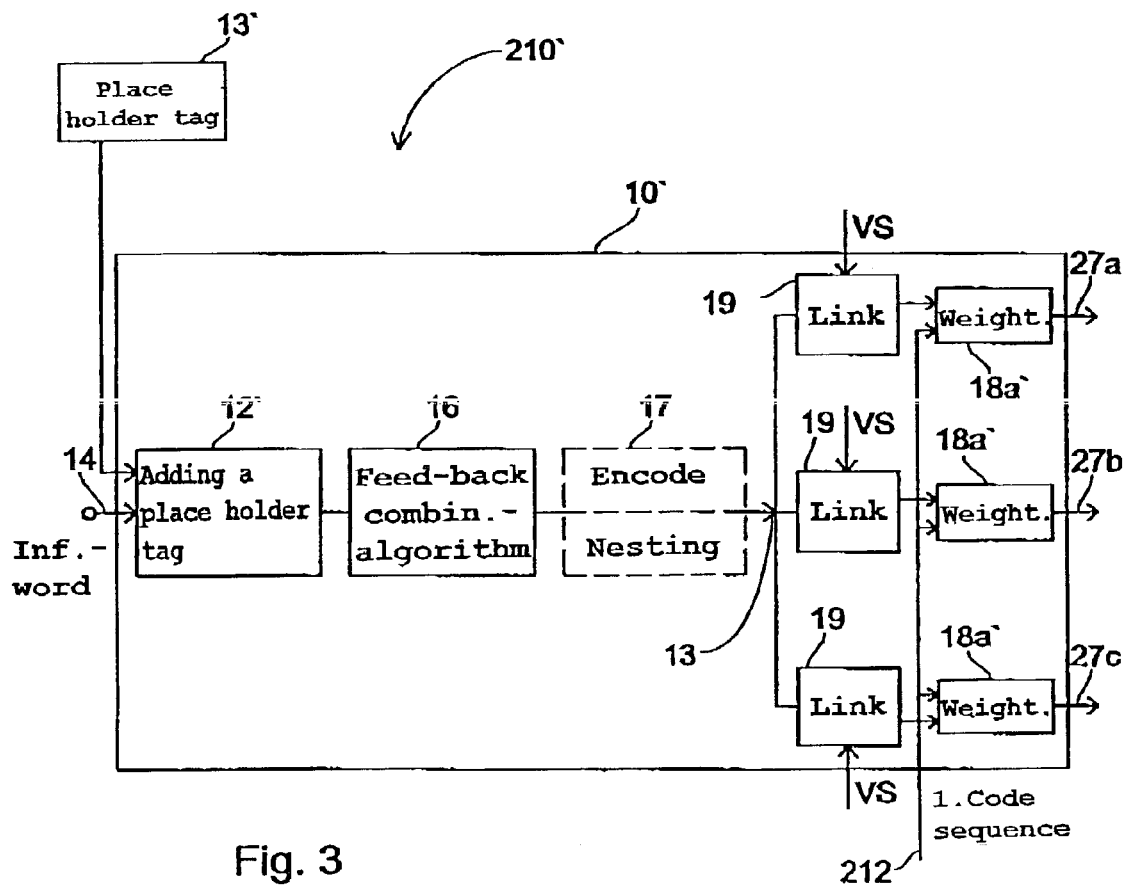
FIG. 3 shows an alternative means for generating a plurality of candidate channel sequences.

FIG. 3 shows an implementation of an apparatus equivalent to FIG. 2 for generating a plurality of candidate channel sequences at the outputs 27a, 27b and 27c. The means 210 further includes a means 10' for forming a plurality of candidate transmit sequences. The means 10' for forming the plurality of candidate transmit sequences comprises an input 14 into which the information word to be processed is to be fed, from which the plurality of candidate channel sequences are to be created at the outputs 27a to 27b.

In contrast to the first embodiment shown in FIG. 2, the connection of the information word to the tag takes place in a somewhat two-stage process, such that only a place holder tag of a place holder tag memory 13' will be provided by a place holder tag adding means 12'. The information word and the place holder tag will then be processed in a means 16 for carrying out an invertible feedback combination algorithm as in the case of FIG. 2, to obtain a combined information word in which the information units of the information word are combined with each other and/or with the inserted place holder tag. Only as an option, said means 16 is followed by a means for channel encoding and/or for interleaving, i.e. nesting, which is generally designated at the reference numeral 17. If said means 17, which is principally optional, is not available, the combined information word will be fed into a number of logic linking means 19. Whereas, if said means 17 is available, it is not the combined information word that is fed into the linking means 19, but a word derived from the combined information word with the deriving regulation corresponding to the processing regulation of block 17.

In the linking means 19 the combined information word which only—implicitly—contains a place holder tag, is linked with different linking sequences, to obtain a linked information word which is uniquely identified by the respective tag. The individual linking sequences (LS) are formed such, that a tag, as it is available in means 22 of FIG. 1, is taken and submitted to the same processing operation as the information word at input 14 of FIG. 2, such that the linking sequence represents the processed tag. By linking the respective processed tag, e.g. by a bit-wise XOR operation, the actual information of the tag is thus entered instead of the place holder tag, as a result of which the different candidate transmit sequences are available at the output of the linking means 19. Finally, these are fed into respective weighting means 18', which are optional from path to path, to obtain weighted candidate channel sequences again using the first code sequence 212.

The concept illustrated in FIG. 3 provides the advantage that during the actual operation said means 12, 16 and, optionally, 17 have to be passed only once to generate the combined information word or the word derived from the combined information word, which will then be distributed on a distributor point 13 among the different linking means. In the second embodiment of the present invention shown in FIG. 2, the tag, as was the case with the first embodiment, is also submitted to a processing operation by said means 12, 16, and optionally, 17, however this does not have to take place during the actual transmission, but may also be performed off-line. Advantageously, the linking sequences outside the actual operation may be calculated and e.g. stored in a ROM, so that the individual linking sequences, the number of which corresponds to the number of tags and, thus, to the number of different candidate transmit sequences, only have to be retrieved during the operation of the digital transmitter. This enables a fast operation.

The concept shown in FIG. 3 also enables a purely serial, a purely parallel or a mixed serial/parallel processing to calculate the plurality of candidate channel sequences. If a purely serial processing is used, only a single means 19 and a single means 18'a are available, whereby, after calculating a candidate sequence, a new linking sequence is fed into the single means 19 in order to calculate the individual candidate channel sequences in successive order. Depending on the functionality, a compromise solution would consist of a decision as to better perform these operations serially, if these consume much time and energy, or, if these are not so, to implement them in parallel, as a result of which it is always possible to find an optimum compromise for each case of application, considering the integration of the entire functionality on an application-specific integrated circuit shown in FIGS. 2 and 3 will eventually be limited to a compromise between chip face, power consumption, size, costs etc.

In the following, reference is made to FIG. 4, which shows a detailed view of the code multiplex modulator shown in FIG. 1. In particular, as a first, a second and a third means for generating a plurality of candidate channel sequences for the first, the second and the third information channel, means are used which are developed according to the alternative concept for the feed-back invertible combination algorithm and place holder tag shown in FIG. 3. In particular, compared to FIG. 3, the blocks encoding 17*a* (ENC) and interleaving 17*b* (ILV) are shown individually in lock 17 in dashed lines in the usually used order. Further, said means 16 for carrying out the invertible feed-back combination algorithm is also referred to as scrambler 16 here, to refer to the implementation form using a feed-back binary shift register which is explained in more detail referring to FIG. 5.

Figure 4:
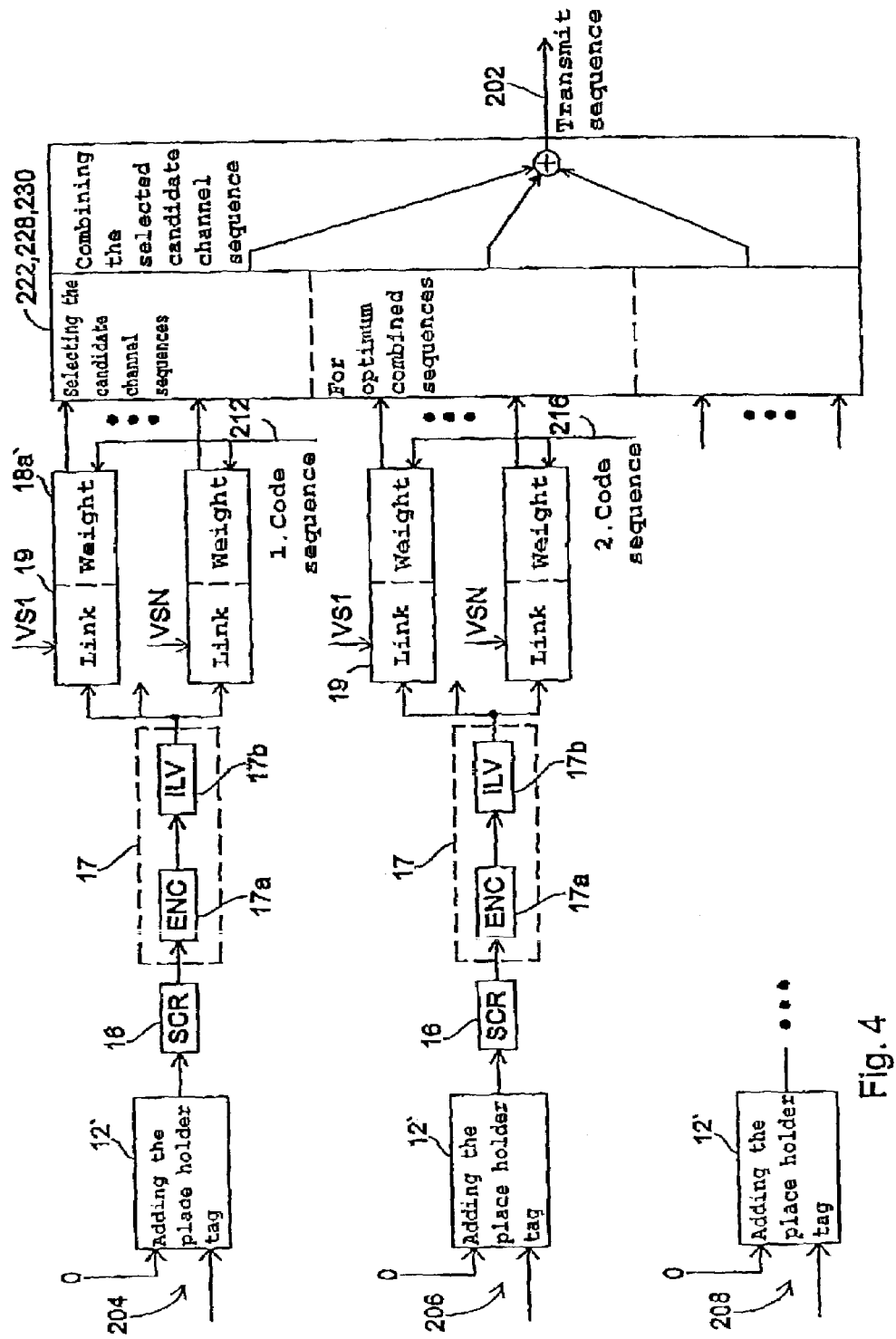
FIG. 4 shows a block diagram of an inventive apparatus having a means for generating the plurality of candidate channel sequences according to FIG. 3 and an alternative selection stage.

In FIG. 4 an overall block is shown at the output of said means 18'*a* for weighting with the code sequences associated with the respective information channels. This overall block is designated with the reference numerals 222, 228 and 230 to refer to the fact that it includes the function of selecting the individual candidate channel sequences for said optimum combination sequence and then the combining of the selected candidate channel sequences which together form the optimum combination sequence, whereby the selected candidate channel sequences which together form the optimum combination sequence still need to be added to obtain the transmit sequence at the output 202 of the apparatus, as it is shown by the adder sign in FIG. 4. At this point it is noted again that there are equivalent solutions, whether first of all all possible combination sequences are formed in order to search such all combination sequences for the optimum combination sequence in order to output the optimum combination sequence then, or whether the candidate channel sequences are selected which together form the optimum combination sequence, whereupon only the selected candidate channel sequences are combined to obtain the transmit sequence.

Figure 9:
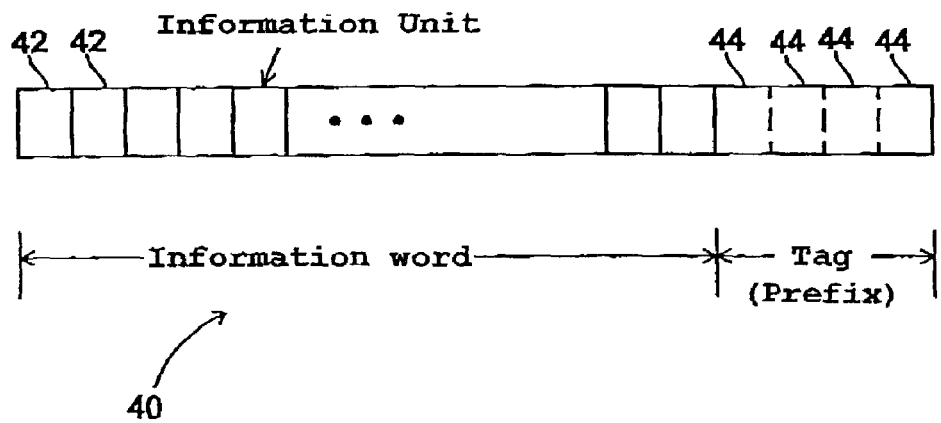
FIG. 9 shows a schematic diagram of an information word with a tag before being processed by an invertible feed-back combination algorithm.

In the following, reference is made to FIG. 9 to explain the structure of an information word. An information word 40, as it is fed into the means 210, 214 or 218 for generating a plurality of candidate channel sequences per information channel 204, 206, 208 at input 14, consists of a plurality of individual information units 42 comprising individual bits in case of a binary implementation. In accordance with one aspect the tag adding means 12 and/or 12' (FIG. 1 to FIG. 4) places either an actual tag or a place holder tag before the information word 40. It should be appreciated that the place holder tag comprises the same length as an actual tag. Typically, a tag, and thus the place holder tag, consists of a number of individual bits 44 with the number of tag bits 44 determining the number of possible candidate transmit sequences. In the case of binary implementation already sixteen candidates can be uniquely identified by four tag bits. In an easy implementation even a single tag bit will suffice to generate two different candidate channel sequences. Preferably, the invertible feed-back combination algorithm is adjusted to the tag, such, that its memory can take on as many different states as different numbers can be represented by the number of tag bits, i.e. as many uniquely distinguishable candidate channel sequences can be generated.

Figure 5:
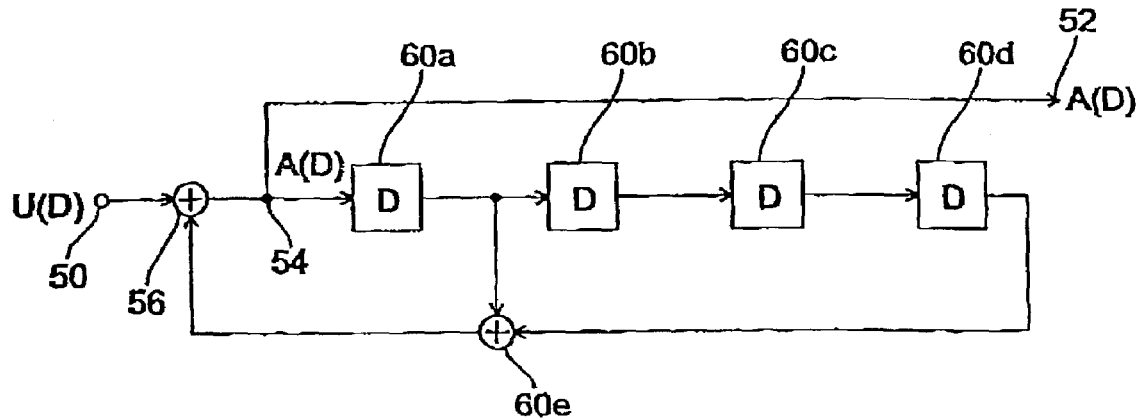
FIG. 5 shows a feed-back shift register for carrying out an invertible feed-back combination algorithm.

The following refers to FIG. 5 which represents an exemplary implementation of the invertible feed-back combination algorithm. As an example, the invertible feed-back combination algorithm can be implemented by means of a feed-back shift register comprising a certain number of delay units designated at D in FIG. 5 and furthermore including a certain number of XOR links and/or operations.

In detail, the shift register shown in FIG. 5 implements an invertible feed-back combination algorithm, which may be designated by a polynomial $1+D+D^4$ with the sign "+" standing for an XOR link which is also referred to as exclusive OR operation. It is known that a XOR operation comprises the following property:

$0+0=0$ $0+1=1$ $1+0=1$ $1+1=0$

Generally it can be stated that a scrambler performing the invertible feed-back combination algorithm can be a feed-back binary shift register which is very similar to a digital filter. In a binary implementation each delay element D stores a bit, which either comprises a value of 0 or a value of 1, and then forwards the same to the next delay element in the next time step, provided that the same is available. It is noted, that in a binary shift register, D stands for $z^{-1}$ in digital filters, in the case of which the signal sequence would then be referred to as A(z), while in this case the subject concerned is a signal sequence A(D).

In detail, the exemplary shift register illustrated in FIG. 5 includes an input 50 and an output 52. A binary input sequence U(D), which is the information word and tag, is applied to the input. The combined information word A(D) is applied to the output. The shift register shown in FIG. 5 includes a feed-back path, which, on its one end 54, is connected to the output, and which, on its other end 56, is connected with one of the two inputs of an XOR-link, whose other input is connected to the input 50 of the shift register. In the example of a shift register shown in FIG. 5, the feed-back path includes a first delay element 60*a*, a second delay element 60*b*, a third delay element 60*c* and a fourth delay element 60*d* and, further, an XOR link 60*e* XORing links the output value of the first delay means 60*a* with the output value of the fourth delay means 60*d* to generate the signal at the second end 56 of the feed-back path. Analogous to the digital filter it is also possible to express the feed-back path in binary shift registers by means of a polynomial. Since there are paths formed after the first and the fourth D elements in the embodiment shown here, the following expression goes:

$$A(D)=U(D)+D \cdot A(D)+D^4 \cdot A(D)$$

from which the following transfer function follows:

$$A(D)/U(D)=1+D+D^4.$$

The feed-back polynomial can also be described by $1+D+D^4$. It should be appreciated that, by means of a shift register, it is possible to generate any feed-back polynomial by using the delay elements of XOR links. Since both, the delay operation and said XOR operation are linear operations in GF(2), "splitting" the operation of the shift register is possible, such that in the second embodiment of the present invention shown in FIG. 2, the same result is reached as with the first embodiment shown in FIG. 1 by processing the information word provided with a place holder tag and by a later linking to a linking sequence.

Figure 6:
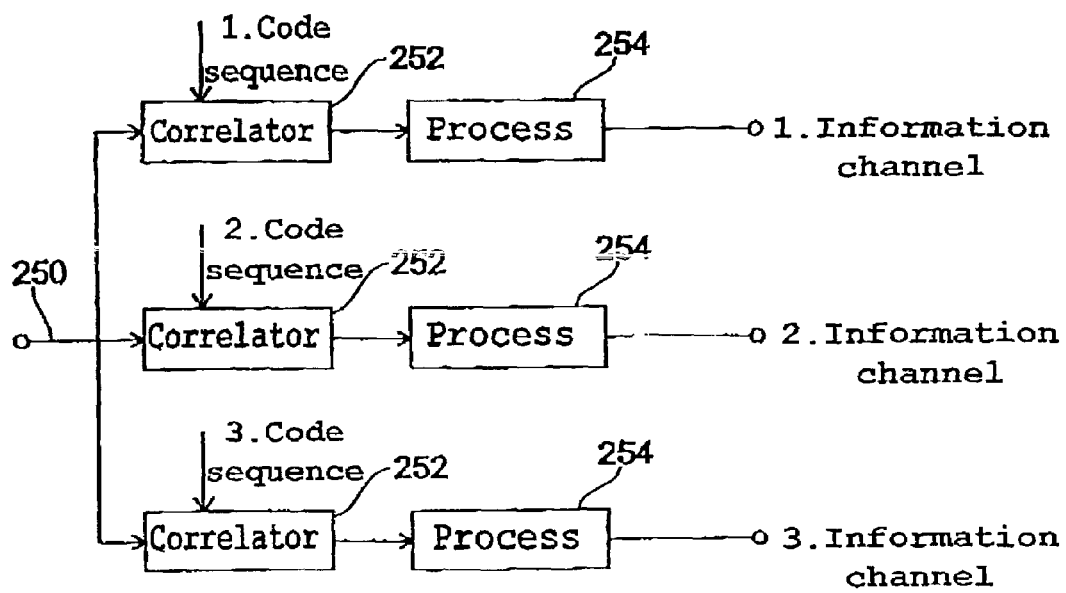
FIG. 6 shows a block diagram of an inventive apparatus for retrieving information of an information channel.

The following provides a general outline of the operation of binary feed-back shift registers to illustrate features of invertible feed-back combination algorithms. If U(D) is a pulse, i.e. a "1" followed by nothing but zeroes, then a pulse response of the scrambler, i.e. of the shift register shown in FIG. 5, is a sequence of ones and zeroes of indefinite length which appears as an arbitrary sequence. Therefore, this sequence is referred to a pseudo noise sequence (pn-sequence) in the art. The scrambler is a linear unit, as only XOR or delay operations occur in the same, which are linear in terms of XOR arithmetic. Thus, the shift register is also invertible to be able to obtain an invertible shift register which will then be used in the descrambler in the receiver (FIG. 6).

If a sequence $U^1(D)$ to be scrambled is "1", as prefix or tag, i.e. is:

$$U(D)=[1U_1(D))$$

as it is handled by said means 12 and/or 12', the pn-sequence pertaining to "1", i.e. to the tag, superimposes linearly on the output sequence $A_1(D)$ pertaining to $U_1(D)$, hence:

$$A(D)=[1(A_1(D)+pn\text{-sequence}]$$

Thus, A(D) looks quite different from $A_1(D)$ as a result of the tag which was a "1" in the example.

If, on the other hand, a "0" is placed in front of $U_1(D)$ the following goes:

$$A(D)=[[0A_1(D)]$$

In a preferred embodiment it is not only a one bit long tag that is placed before the sequence $U_1(D)$ to be transmitted, but a several bit long tag in order to obtain not only two different candidate channel sequences (in the case of a single serial or in the case of a single 1) but e.g. 16 different candidate channel sequences. In this case, the output sequence $A_1(D)$ is now superimposed with several time-shifted pn-sequences. The resulting output sequence A(D) does provide a random appearance and differs only from the output sequences for other tags, so that the probability increases that a combined sequence with a low peak value results by a combination with this candidate channel sequence.

To put it in illustrative terms, the function of the tag can also be presented such, that the tag first passing into the shift register forces the shift register into a certain state, starting from which the information word following the tag in the input sequence is scrambled, i.e. processed by the invertible feed-back combination algorithm.

It should be appreciated that all of the delay units of the feed-back path of the shift register, prior to generating another candidate channel sequence using another tag, have to be set back to a defined state which is preferably the 0-state and which is preferably also the state which is represented by the place holder tag.

As has always been explained, it is not essential for the means for adding the tags and/or the place holder tag to place the tag as a prefix immediately in front of the information word, but that it is principally sufficient to add the tag to the information word in some way or other in order to be combined with the information word. The further at the front the tag is located, however, the more different the totality of the individual candidate channel sequences is, when no interleaver is used. If, however, an interleaver is used, the influence of a location of the tag in/at the information word is still reduced to the varying nature of the candidate channel sequences. In this case the receiver also has to know, however, where the tag stands in the information word to extract the same in order to receive the information word without a tag.

FIG. 6 shows an apparatus for retrieving information of an information channel from a received transmit sequence 250 which is applied to an input of the apparatus shown in FIG. 6. After the transmit sequence has been received using different code sequences for different information channels and using different candidate channel sequences for the first information channel and optionally for further information channels, first of all the individual information channel needs to be extracted from the received transmit sequence step by step to receive the candidate channel sequence which then still needs to be processed to be able to conclude the information word and/or the information that the respective candidate channel sequence comprises.

For extracting a channel, for every information channel said correlator 252 is used, as it was already described in general, which is now respectively controlled and/or set by the code sequence which is associated with the channel to be able to extract any information channel. Thereby the weighting with the respective code sequence in the receiver is reversed again, such, that after the correlator the same number of e.g. bits is available, which were available at the input of the first, the second or the third generation means in FIG. 1—apart from eventual channel codings. Downstream to every correlator 252 a processing means 254 is located to be able to take a conclusion from the respective candidate channel sequence located before said means 254 to the information underlying this candidate channels sequence.

Figure 7:
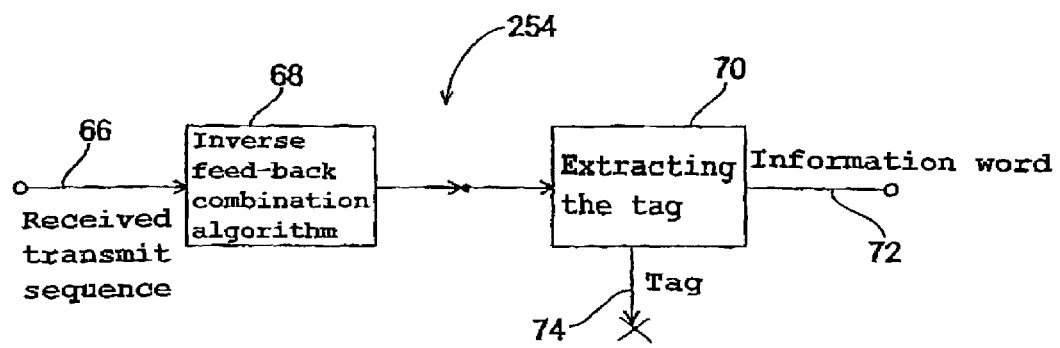
FIG. 7 shows a detailed block diagram of a processing means of FIG. 6.

Thus, it is the object of the receiver to determine in what way and/or how the candidate channel sequence to the processed was derived from the underlying information in order to reverse this derivative and/or processing. If an SLM concept was used, wherein the transmission of page information was necessary, then the respective processing means 254 need to be reset by co-transferred page information from received transmit sequence to received transmit sequence. If, however, the candidate channel sequences were processed using the invertible feed-back combination algorithm, as it was illustrated referring to FIGS. 2 and 3, then an explicit transmission of page information is not necessary. A means 254 for processing the candidate channel sequence may, for example be designed to retrieve the information for the first information channel, as it is shown in FIG. 7.

In the following, reference is made to FIG. 7, which shows an inventive apparatus for retrieving an information word from a received transmit sequence (after a preprocessing by the correlator 252, the deinterleaver and the channel decoder), which may be contained in a digital news receiver. A received transmit sequence is fed into the input 66. The object is now to reverse the combination operation carried out in the transmitter in order to receive the information word.

Therefore the received transmit sequence is processed using an algorithm which is inverse to the feed-back combination algorithm, which was used in the transmitter in order to generate the received transmit sequence. This is done by a means 68, which again outputs the information word and tag shown in FIG. 1, apart from transmission errors. Now only a tag needs to be extracted 70 to receive the information word at an output 72. It should be appreciated that the tag itself is not explicitly necessary as it already served to force the inverse feed-back combination algorithm into an initial state related to the initial state caused in the transmitter by the tag, which is now a forward coupled algorithm due to the inversion. The tag can thus simply be discarded, as it is shown schematically at 74 in FIG. 6.

It should be appreciated that the inverse algorithm performing means 68 in addition to the feed-back combination algorithm performing means 16 in the transmitter, before each decoding process of an information word, has to be reset to a defined state which is preferably the 0 state. Not until then may the information word output by the decoder 84 be supplied, which immediately results in the delay means taking on a certain state in the forward coupling path due to the tag. Based on this state the combined information word is combined again.

It should be appreciated that the receiver, as a by-product so to speak, is explicitly capable of retrieving the candidate number, i.e. the tag, and that it does not explicitly require the same for retrieving the data.

Figure 8:
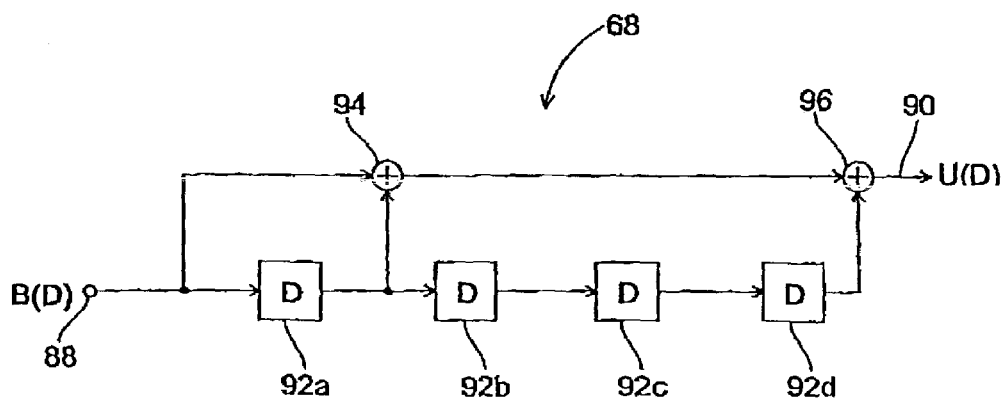
FIG. 8 shows a forward coupled shift register for implementing an algorithm which is inverse to the invertible feed-back combination algorithm.

A forward coupled binary shift register shown in FIG. 8, which may be provided in the means 68 of FIG. 7, on the other hand includes an input 88 and an output 90. At the input the combined information word designated B(D) and the combined tag are applied. This received transmit sequence is fed in bit after bit to put the four delay units 92a—92b gradually into their desired states to decombine and/or descramble the combined information words gradually streaming in at the input 88. Consequently, the binary shift register shown in FIG. 8 also contains two XOR linking means 94 and 96. The output sequence at the output 90, which is again designated at U(B) is fed into the means 70 for extracting the tag in order to finally receive the information word.

The present invention provides highest flexibility already with a very low number of candidate channel sequences only in one information channel of several information channels. The number of possible channel sequences provided to a user for any user may be chosen arbitrarily and in particular also differently. If there are for example sixteen users, two candidate channel sequences may, for example, be provided for the first four users and only one single candidate channel sequence for the remaining users. In such a case no means for generating the different candidate sequences are needed for the remaining twelve users, like for example the scrambler 16 or the means for adding a tag and/or a place holder tag (FIG. 4). There are sixteen possible sum signals now as the first four users respectively comprise two possible candidate channel sequences, while only one candidate channel sequence is present at the remaining twelve users. Among theses sixteen possible combined transmit sequences the optimum transmit sequence is selected now. The same constellation may also be achieved if only two channels respectively comprise four different candidate channel sequences. For the other information channels in which only one single candidate channel sequence exists no respective processing means would be needed also in the receiver. As therefore the selection and/or optimising only takes place after the combination and is not carried out independently for the individual information channels a high diversity may already be reached with a low number of candidate channel sequences, so that it may be assumed that the individual combined sequences available are sufficiently diverse so that a transmit sequence is present which leads to a lower out-off-band radiation as the other combined sequences which are available for selection.

The invention claimed is:

1. An apparatus for generating a transmit sequence comprising information from a plurality of information channels, comprising:

first means for generating a plurality of different candidate channel sequences from information of a first information channel of the plurality of information channels using a first code sequence associated with the first information channel, wherein each candidate channel sequence carries the same information as the information of the first information channel;

second means for creating a candidate channel sequence for a second information channel from the plurality of information channels using a second code sequence associated with the second information channel and differing from the first code sequence;

means for combining each candidate channel sequence for the first information channel with the candidate channel sequence for the second information channel in order to obtain a plurality of combined sequences; and means for selecting a combined sequence from the plurality of combined sequences as a transmit sequence, which fulfils a predetermined criterion.

2. An apparatus for generating a transmit sequence comprising information from a plurality of information channels, comprising:

first means for generating a plurality of different candidate channel sequences from one piece of information of a first information channel of the plurality of information channels using a first code sequence associated with the first information channel, wherein each candidate channel sequence carries the same information as the information of the first information channel;

second means for generating a candidate channel sequence for a second information channel from the plurality of information channels using a second code sequence associated with the second information channel and differing from the first code sequence;

means for selecting candidate channel sequences and combining the selected candidate channel sequences, the selected candidate channel sequences, when combined, resulting in a combined sequence, which fulfills a predetermined criterion.

3. The apparatus according to claim 1, wherein the second means is arranged for generating in order to generate at least one further candidate channel sequence apart from the one candidate channel sequence using the second code sequence, which is different from the one candidate channel sequence, wherein the one candidate channel sequence and the at least one further candidate channel sequence carry the same information, wherein the means for combining is arranged to combine each candidate channel sequence for the first information channel with each candidate channel sequence for the second information channel in order to obtain the plurality of combined sequences.

4. The apparatus according to claim 3, wherein the number of candidate channel sequences for the first information channel is different from the number of candidate channel sequences for the second information channel.

5. The apparatus according to claim 1, further comprising:

a third means for generating a plurality of different candidate channel sequences for a third information channel using a third code sequence associated with the third information channel, wherein the means for combining is arranged to combine every candidate channel sequence of an information channel with one candidate channel sequence each from one further information channel such that each combined sequence is formed by a combination of exactly one candidate channel sequence of every information channel.

6. The apparatus according to claim 1, wherein the first and second means for generating the plurality of different candidate channels sequences are arranged to operate using first and second code sequences for the first and second information channels the first and second code sequences being basically orthogonal to each other.

7. The apparatus according to claim 1, wherein the means for combining is arranged to add up the respective candidate channel sequences to obtain a combined sequence.

8. The apparatus according to claim 1, wherein at least the first means for generating a plurality of different candidate channel sequences comprises the following:
   means for adding a tag to an information word of the first information channel;
   means for processing the information word and the added tag by an invertible feed-back combination algorithm to receive a combined information word, in which the information units are combined with each other and/or with the added tag, such, that the combined information word is uniquely identified by the tag; and
   means for weighting the combined information word with the first code sequence associated with the first channel.

9. The apparatus according to claim 8, wherein a redundancy encoder and/or an interleaver is connected upstream to the weighting means.

10. The apparatus according to claim 1, wherein the at least one means for generating a plurality of candidate channel sequences comprises the following:
   means for adding a place holder tag to an information word of the first information channel;
   means for processing the information word and the added place holder tag by an invertible feed-back combination algorithm in order to obtain a combined information word, in which the information units are combined with each other and/or with the added place holder tag;
   means for linking the combined information word or one of the words derived from the combined information word with a linking sequence determined using the same feed-back combination algorithm from a tag different from the placeholder tag in order to receive a linked information word uniquely identified by the tag; and
   means for weighting the linked information word with the first code sequence.

11. The apparatus according to claim 10, wherein a redundancy encoder and/or an interleaver is connected downstream to the means for processing in order to generate a word derived from the combined information word.

12. The apparatus according to claim 8, wherein the means for processing by an invertible feed-back combination algorithm includes a shift register, further comprising:
   an input;
   an output;
   a feed-back path with a first and a second end, wherein its first end is connected to the output and comprises at least one delay unit; and
   an XOR linking unit for XORing an information unit at the input with a value applied to the second end of the feed-back path, wherein the XOR linking means is connected to the output at the output site.

13. The apparatus according to claim 1, arranged in order to be used in a transmitter of a base station of a mobile communication system.

14. A method for generating a transmit sequence comprising the information from a plurality of information channels, comprising the following steps:
   generating a plurality of different candidate channel sequences from information of a first information channel of the plurality of information channels using a first code sequence associated with the first information channel, wherein each candidate channel sequence carries the same information as the information of the first information channel;
   generating a candidate channel sequence for a second information channel from the plurality of information channels using a second code sequence associated with the second information channel and differing from the first code sequence;
   combining each candidate channel sequence for the first information channel with the candidate channel sequence for the second information channel in order to obtain a plurality of combined sequences; and
   selecting a combined sequence from the plurality of combined sequences as a transmit sequence fulfilling a predetermined criterion.

15. A method for generating a transmit sequence comprising the information from a plurality of information channels, comprising the following steps:
   generating a plurality of different candidate channel sequences from information from a first information channel of the plurality of information channels using the first code sequence associated with the first information channel, wherein each candidate channel sequence carries the same information as the information of the first information channel;
   generating a candidate channel sequence for a second information channel from the plurality of information channels using a second code sequence associated with the second information channel and differing from the first code sequence;
   selecting candidate channel sequences and combining the selected candidate channel sequences, the selected candidate channel sequences, when combined, resulting in a combined sequence, which fulfils a predetermined criterion.

* * * * *

UNITED STATES PATENT AND TRADEMARK OFFICE
CERTIFICATE OF CORRECTION

PATENT NO. : 7,126,980 B1
APPLICATION NO. : 10/149468
DATED : October 24, 2006
INVENTOR(S) : Breiling It is certified that error appears in the above-identified patent and that said Letters Patent is hereby corrected as shown below:

On Title Page and Col. 1, Line 1
Item (54): Please change the Title from, "Par and Out-of-Band Radiation Reduction in Code Multiplex Modulation Systems", to --APPARATUS AND METHOD FOR GENERATING A TRANSMIT SEQUENCE AND APPARATUS AND METHOD FOR RETRIEVING INFORMATION--

Signed and Sealed this

Ninth Day of January, 2007

JON W. DUDAS
*Director of the United States Patent and Trademark Office*